United States Patent
Davis

(10) Patent No.: US 6,993,040 B2
(45) Date of Patent: Jan. 31, 2006

(54) ADAPTIVE SERVICE WEIGHT ASSIGNMENTS FOR ATM SCHEDULING

(75) Inventor: Tom Davis, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 10/192,661

(22) Filed: Jul. 11, 2002

(65) Prior Publication Data

US 2003/0076834 A1   Apr. 24, 2003

Related U.S. Application Data

(63) Continuation of application No. 09/688,192, filed on Oct. 16, 2000, now Pat. No. 6,434,160, which is a continuation of application No. 08/880,284, filed on Jun. 24, 1997, now Pat. No. 6,157,654.

(51) Int. Cl.
H04L 12/56 (2006.01)

(52) U.S. Cl. .................................. 370/412; 370/428

(58) Field of Classification Search ............... 370/229, 370/230, 285, 289, 395.41, 396, 397, 398, 370/399, 412, 413, 414, 428
See application file for complete search history.

(56) References Cited

U.S. PATENT DOCUMENTS

| | | | |
|---|---|---|---|
| 5,517,495 A | 5/1996 | Lund et al. ................ 370/60 |
| 5,533,020 A | 7/1996 | Byrn et al. ............... 370/60.1 |
| 5,535,201 A | 7/1996 | Zheng ..................... 370/60.1 |
| 5,577,035 A | 11/1996 | Hayter et al. ............... 370/60 |
| 5,745,490 A | 4/1998 | Ghufran et al. ............ 370/397 |
| 5,748,614 A | 5/1998 | Wallmeier ................ 370/235 |
| 5,748,629 A | 5/1998 | Caldara et al. ............ 370/389 |
| 5,805,577 A | 9/1998 | Jain et al. ................ 370/234 |
| 5,864,540 A * | 1/1999 | Bonomi et al. ............ 370/235 |
| 5,872,769 A | 2/1999 | Caldara et al. ............ 370/230 |
| 5,883,895 A | 3/1999 | Davis et al. .............. 370/462 |
| 5,889,779 A | 3/1999 | Lincoln ................... 370/398 |
| 6,229,812 B1 | 5/2001 | Parruck et al. ............ 370/412 |
| 6,262,986 B1 | 7/2001 | Oba et al. ................ 370/399 |

OTHER PUBLICATIONS

"Self-clocked fair queueing scheme for broadband applications", S. Jamaloddin Golestani, IEEE, 1994, pp. 636-646.

\* cited by examiner

*Primary Examiner*—Bob A. Phunkulh
(74) *Attorney, Agent, or Firm*—Marks & Clerk; S. Mark Budd

(57) ABSTRACT

A system and method for adaptively assigning queue service weights to an ATM traffic management controller in order to reduce service weight update calculations. The implementation of a fair weighted queuing scheme on a network is divided into two functions: queue arbitration; and queue weight configuration. Queue arbitration is performed via a virtual time-stamped fair queuing algorithm. The queue weight configuration is performed via a reconfigurable weighted fair queuing controller wherein bandwidth requirements are calculated in response to connection setup and release values.

16 Claims, 4 Drawing Sheets

ADAPTIVE SERVICE WEIGHT ASSIGNMENTS FOR ATM SCHEDULING

This is a continuation of U.S. Ser. No. 09/688,192 filed Oct. 16, 2000, now U.S. Pat. No. 6,434,160, which is a continuation of U.S. Ser. No. 08/880,284 filed Jun. 24, 1997, now U.S. Pat. No. 6,157,654.

FIELD OF THE INVENTION

This invention relates to asynchronous transfer mode (ATM) traffic management processes and more particularly to an adaptive service weight assignment algorithm for an ATM traffic manager.

BACKGROUND

The ATM forum traffic management specification currently defines five service categories which classify traffic according to source behavior and quality of service guarantees. The five service categories are: constant bit rate (CBR), real time variable bit rate (rtVBR), non-real time variable bit rate (nrtVBR), available bit rate (ABR) and unspecified bit rate (UBR). The quality of service classifications are: cell delay variation (CDV), cell transfer delay (CTD), and cell loss ratio (CLR). In order to guarantee the quality of service, a network element must employ a versatile and robust scheduling algorithm which is capable of servicing many queues in a fair manner. Simple scheduling disciplines such as exhaustive round-robin (ERR) were sufficient for system with only two queues, but as the number of queues increases to three and more, ERR may result in starvation of the lower priority queues.

S. GOLESTANI "A Self-clocked Fair Queuing Scheme for Broadband Applications" INFOCOM 1994 describes a queue scheduling algorithm, weighted fair queuing (WFQ) which has been adopted by industry vendors of ATM equipment. This scheduling scheme is capable of servicing any number of queues, while providing fair and work-conserving access to bandwidth. One of the key features of WFQ is that the CDV and CTD are bounded for any queue as long as it is given an appropriate weight.

The calculation of an appropriate service weight for a queue is performed given parameters which define the source behavior of all member connections and the defined quality of service for the queue. The device which performs this calculation (WFQ Control) currently operates according to one of the following two disciplines:

On the addition or removal of a connection from the queue, a new service weight is calculated, and the update is downloaded to the WFQ arbiter; or Service weights are configured for each queue and downloaded to the WFQ arbiter by a network management entity, and connections are rejected by the network element if it is determined that quality of service guarantees will be violated by the addition of the connection.

Both of these current disciplines are not desirable in an ATM LAN Emulation (LANE) environment. The first discipline is undesirable because it requires that new service weights be downloaded on every connection setup. Given the fact that the service weight download operation is real-time expensive, this has an adverse affect on call setup performance. In a LANE environment, in which bandwidth is provided on demand, call setup is very frequent, and a low call setup rate has an adverse effect on network performance. The second discipline is not desirable because the network operator may not be able to predict the demand for a particular service category. The network would require constant monitoring and maintenance in order to ensure that the service partitions reflect demand.

The present invention provides an adaptive queue service weight scheme in the WFQ Control device which minimizes the number of service weight updates, and converges to a bandwidth partition between queues which is representative of demand.

SUMMARY OF THE INVENTION

Therefore in accordance with a first aspect of the present invention there is provided a system for implementing an adaptive service weight assignment algorithm in an ATM traffic manager, the system comprising; queue arbitration means to assign service weights to connections in proportion to bandwidth demands, and queue weight configuration means to process service traffic in accordance with assigned weights.

In accordance with a second aspect of the present invention there is provided a method of assigning fair weight queuing values to service connections in an ATM traffic manager, the method comprising: evaluating each queue in a plurality of service queues and assigning a time incremented weighted value to each queue; and establishing a connection for each queue on the basis of the weighted value.

BRIEF DESCRIPTION OF THE DRAWINGS

The invention will now be described in greater detail with reference to the attached drawings wherein.

DETAILED DESCRIPTION OF THE INVENTION

Figure 1:
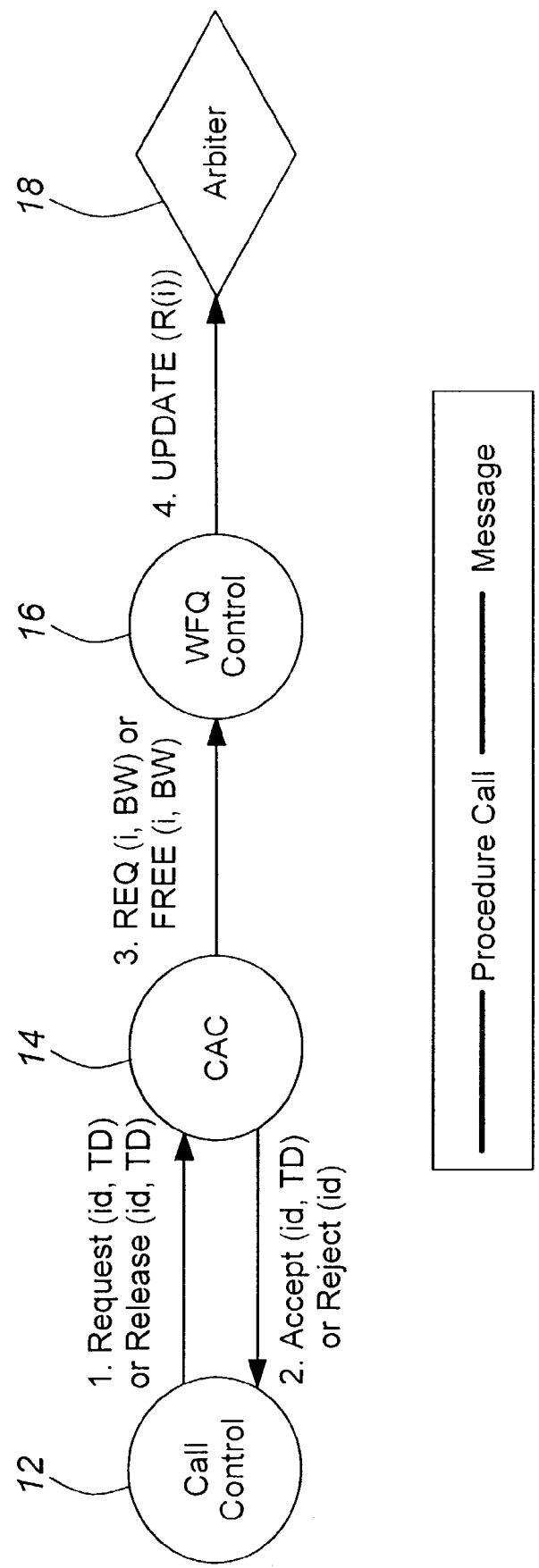
FIG. 1 is a flow diagram of information flow from the call processor to the queue arbiter driver.

The implementation of WFQ is divided into two functions: queue arbitration; and parameter (queue weight) configuration.

Queue arbitration is performed via a virtual time-stamped fair queuing (VSFQ) algorithm. The algorithm in the present application is for an architecture in which backpressure may be asserted on a per port basis.

Queue weight configuration is performed in software in response to connection setup and release events. The bandwidth demand of a queue is calculated explicitly by the Connection Admission Control and the information is passed to the WFQ Control. WFQ Control converts the bandwidth requirement into queue weights, and downloads new configuration values if necessary.

The VSFQ algorithm arbitrates between output queues by maintaining a virtual time-stamp for each queue. Each time that a queue is serviced, the time-stamp for that queue is incremented by a pre-configured queue weight. The output queue with the lowest time-stamp is the one which is serviced on the next output cycle.

The VSFQ algorithm is described below for an implementation in which backpressure is asserted from the line card towards the arbitration ASIC. An implementation which does not use backpressure signals is a subset of the algorithm below. Note that in this algorithm, backpressure is asserted on a per port basis, and it therefore affects all queues that feed onto that port.

A distinction is made between queues which service real-time traffic and those which service non-real-time traffic (through the variable $rt_{ij}$). A cell which arrives in an empty real-time queue is serviced immediately, and one which arrives in an empty non-real-time queue is serviced after the time increment period of the queue.

The algorithm described below operates on a single output path from the switching chip. Within a given output cycle, this algorithm is repeated for each output path from the switching core. Define i to represent a port, and j a service queue dedicated to that port. Define the following parameters:

$Q_{ij}$ service queue, j, for port I.
$N_{ij}$ number of cells in $Q_{ij}$
$R_{ij}$ time increment value (weight) for $Q_{ij}$.
$s_{ij}$ present time stamp for $Q_{ij}$.
$s_{now}$ current virtual time.
$b_i$ backpressure status for $Q_{ij}$, for all j.
$rt_{ij}$ Qij services real-time traffic (i.e. $rt_{ij}=1$ means rt-designated).

```
a) Initialization
    for all ij {
        sij = 0
    }
    snow = 0;
b) Cell arrival at Qij
    if (Nij == 0) {
        if (bi == 0) {
            if (rtij == 1) {
                sij = Rij;
            } else {
                sij = Rij + snow;
            }
        } else {
            if (rtij == 1) {
                sij = 0;
            } else {
                sij = Rij;
            }
        }
    }
    Nij++;
c) Service time
    select minimum sij, for ((Nij>0)&&(bi == 0));
    snow = sij;
    Nij--;
    sij = sij + Rij;
d) Backpressure cleared on port i
    for all j {
        sij -= snow;
    }
    bi = 1;
e) Backpressure cleared on port i
    for all j {
        sij=+ snow;
        bi = 0;
```

The configurable parameters for the VSFQ algorithm are the queue weights $1/R_{ij}$. Each service queue is assigned a weight so that the cell loss and delay statistics for that queue satisfy the requirements of the most demanding connection which occupies that queue. It follows from this that connections with similar quality of service (QoS) requirements are grouped in the same service queue.

The following is a minimal description of the software architecture needed to understand the flow of information; a description of the performance observations and design requirements which drive the design of the configuration algorithm; a description of the software components; and a proposal for an algorithm to minimize the number of queue weight update messages.

The key software components in the queue weight update path are: Call Control; CAC; WFQ Control; and the Arbiter Driver. FIG. 1 illustrates the flow of information from Call Processing to the queue Arbiter driver.

When a connection is established or released, Call Control 12 requests resources from Connection Admission Control (CAC) 14. CAC 14 calculates the required bandwidth and buffer based on QoS requirements (CDV, CTD, and CLR), and either admits or rejects the connection. The required bandwidth and the service queue index is then downloaded from CAC 14 to WFQ Control 16 which, if necessary, downloads one or more new queue weights to the Arbiter 18.

The following describes the performance observations and resulting design requirements of the weight allocation scheme.

OBSERVATIONS

1, The service rate of a real-time queue will generally need a bandwidth allocation of $\geq \Sigma PCR$ (Peak Cell Rate) to meet the cell delay requirements. Due to cell level congestion (simultaneous arrival of cells from independent sources) the bandwidth demand on a shared queue servicing real-time traffic is greater than $\Sigma PCR$ for transient periods of time. A queue servicing at $\Sigma PCR$ therefore experiences greater cell delay than one servicing at greater than $\Sigma PCR$.

2, WFQ arbitration can be used to produce different maximum cell delay statistics in two or more real-time queues. ERR does not provide this flexibility. As a result, more than one real-time queue may be configured per output port, each supporting a different QoS. Real-time occupancy is then increased by intelligently distributing real-time traffic between the real-time queues. The impact of this point is that there is an advantage for weights to be reconfigurable for real-time queues.

3, The cell loss statistics of non-real-time queues are not significantly affected by the bandwidth allocation to real-time queues in the range [$\Sigma PCR,LR$] (LR=line rate). The significance of this point is that bandwidth may be allocated to non-real-time queues assuming that only $\Sigma PCR$ were allocated to the real-time queues.

The following design requirements follow from these observations.

1: The allocation of bandwidth to real-time queues may not exceed LR.

2: The allocation of bandwidth to non-real-time queues may not exceed LR—$\Sigma PCR$ (of real time queues).

3: CAC must communicate to WFQ Control the bandwidth requirement and $\Sigma PCR$ for real-time queues.

4: Although the observation 1 would suggest that an assignment of LR to all real-time queues may be sufficient (i.e. a time increment value of zero to each real-time queue, and therefore exhaustive round-robin between real-time queues), observation 2 indicates that benefit can be derived from actively setting the weights on real-time queues.

The following describes how real time bandwidth requirements are specified.

It follows from design requirement 3 that real-time queues have two bandwidth requirements: one which represents the average bandwidth utilized; and one which represents the maximum bandwidth utilized during transient periods. These requirements are defined as steady-state and transient respectively.

In order to implement an algorithm by which these two requirements are met, two bandwidth totals are maintained: the steady-state total; and the transient total. Bandwidth is said to be allocated from the steady state and transient pools.

The variable, trBW, is defined to represent the transient bandwidth required for a given queue. Table 1 lists the values for trBW for different service categories. The calculation of trBW is performed by CAC.

TABLE 1

| Service Category | trBW |
|---|---|
| CBR | ≥ΣPCR |
| rtVBR | ≥ΣPCR |
| nrtVBR | 0 |
| ABR | 0 |
| UBR | 0 |

The variable, ssBW, is defined to represent the steady-state bandwidth required for a particular queue. Table 2 lists the values for ssBW for different service categories.

TABLE 2

| Service Category | ssBW |
|---|---|
| CBR | ΣPCR |
| rtVBR | ΣPCR |
| nrtVBR | ΣVBW |
| ABR | ΣMCR |
| UBR | ΣMCR |

The virtual bandwidth (VBW) of a connection represents the dedicated rate required so that the connection does not cause the queue to overflow.

With the addition of each connection, CAC downloads both the transient and steady-state BW requirements to WFQ Control. It is the responsibility of WFQ Control to ensure that the weights are calculated to satisfy both bandwidth, demands.

The following describes a high level description of the method by which CAC calculates bandwidth to be downloaded to WFQ Control.

The bandwidth dedicated to the real-time traffic in the transient pool is chosen so as to meet cell loss ratio (CLR), cell transfer delay (CTD), and cell delay variation (CDV) thresholds. CBR connections calculate the maximum utilization recommended in a line before one of the quality of service thresholds is violated. Modifying this approach to queue weight calculation, one can calculate the service rate required, given the current occupancy of CBR traffic. This service rate is generally greater than or equal to ΣPCR, and is used as the transient bandwidth requirement for the CBR queue. A similar approach is taken for rtVBR traffic.

The allocation of bandwidth for real-time queues in the steady-state pool is given as ΣPCR.

The bandwidth dedicated to non-real-time traffic in the steady-state pool is chosen so as to guarantee a certain sustained cell rate, and in the case of nrtVBR traffic, to meet the CLR criterion. The allocation of bandwidth to the nrtVBR queue follows the virtual bandwidth approach.

WFQ Control is responsible for calculating the time increment values for input into the VSFQ algorithm. The queue weights are set in order to represent the bandwidth distribution in each of the transient and steady-state pools.

The steady-state pools contain a total bandwidth allocation for all connections which sum to the line rate, LR $$LR = \sum_i (ssBW_i + ssSpare_i)$$

where $ssSpare_i$ is the steady-state spare bandwidth allocated to queue i. The transient pool, contains a total bandwidth allocation for non-real-time traffic, trTnrt, and a total bandwidth allocation for real-time traffic, trTrt, which sum to the line rate.

$$Lr = trTrt + trTnrt,$$
$$trTrt = \sum_{i \in rt} (trBW_i + trSpare_i).$$

where $trSpare_i$ is the transient spare bandwidth allocated to queue i. Undefined in the above equation is trTnrt because non-real-time queues do not require transient bandwidth (observation 3). The specification of trTnrt is therefore driven by the dimensioning of the $R_i$ registers in hardware. It is desirable to have equal granularity for both the steady-state and transient pools. If the size of the $R_i$ register in hardware is n bits, then hardware scaling constants, $k_{rt}$ and $k_{nrt}$, are defined for real-time and non-real-time queues respectively, such that $R_i$ values for real-time queues are given by $$R_i = \frac{k_{rt}}{trBW_i + trSpare_i},$$
$$k_{rt} = LR$$

and for non-real-time queues is given by $$R_i = \frac{k_{nrt}'}{ssBW_i + ssSpare_i}$$

$k_{nrt} = 2^{n/2} X LR.$

The minimum bandwidth assigned to a queue is then defined to be minW=LR/$2^{n/2}$. As a result, time increment values for real-time queues are in the range [1, $2^{n/2}$], and for non-real-time queues are in the range [$2^{n/2}$,$2^n$]. The value of trTnrt is then given by LR/$2^{n/2}$ (the minimum value), and trTRt is fixed at (1−$2^{n/2}$)LR. This represents a value of trTrt=0.999LR for a 20 bit R register.

The specification of $ssBW_i$ and $trBW_i$ is performed by CAC. The allocation of spare bandwidth between the queues is performed in pursuit of one of the following two mutually exclusive design goals.

1, The minimum bandwidth required to satisfy the QoS requirements is allocated to real-time and nrtVBR traffic, and all remaining (spare) bandwidth is allocated to UBR and ABR queues. This is the traffic performance optimal solution.

2, Spare bandwidth is distributed between the service queues so as to minimize the number of queue weight downloads while still guaranteeing the QoS requirements of real-time and nrtVBR queues. This is the call setup performance optimal solution.

The allocation of spare bandwidth to satisfy 1 is trivial. An algorithm to achieve the bandwidth allocation to satisfy 2 is provided below.

When a new bandwidth demand for a queue is received from CAC, WFQ Control determines whether the demand can be met by the existing queue weights by comparing the request with the spare part allocated to the queue. If the demand is less than the spare part, then the spare bandwidth for the queue is reduced. No weight update is necessary. If the demand cannot be met, spare bandwidth is extracted from all queues in equal proportion, and a new weight is calculated for the queue. When bandwidth is returned to a queue (through a connection release,) the queue weight is not changed, and the spare bandwidth for the queue is increased by the released bandwidth.

A feature of this algorithm is that spare bandwidth is allocated to queues which have most recently used that bandwidth. This is an adaptive characteristic in which the switch converges to a spare bandwidth distribution which reflects actual demand.

Figure 2:
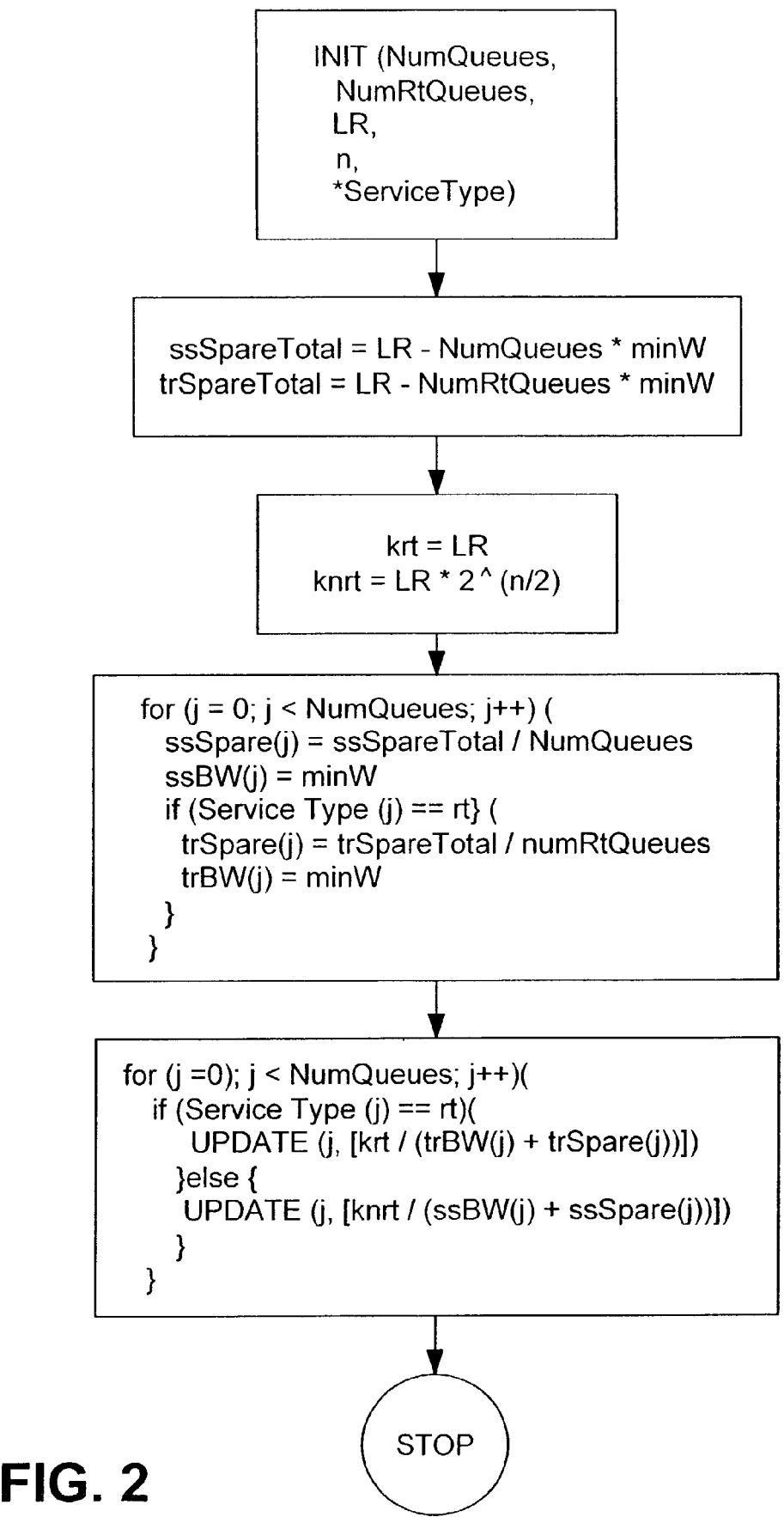
FIG. 2 illustrates the initialization algorithm.

The initialization of WFQ Control is performed by CAC, which configures the number of service queues, the total free bandwidth to be shared by all service queues, and the service type of each service queue (real-time or non-real-time). The free bandwidth is distributed equally within the transient and steady-state pools, and the weights for all queues are downloaded to the arbiter driver. FIG. 2 illustrates this initialization.

Figure 3:
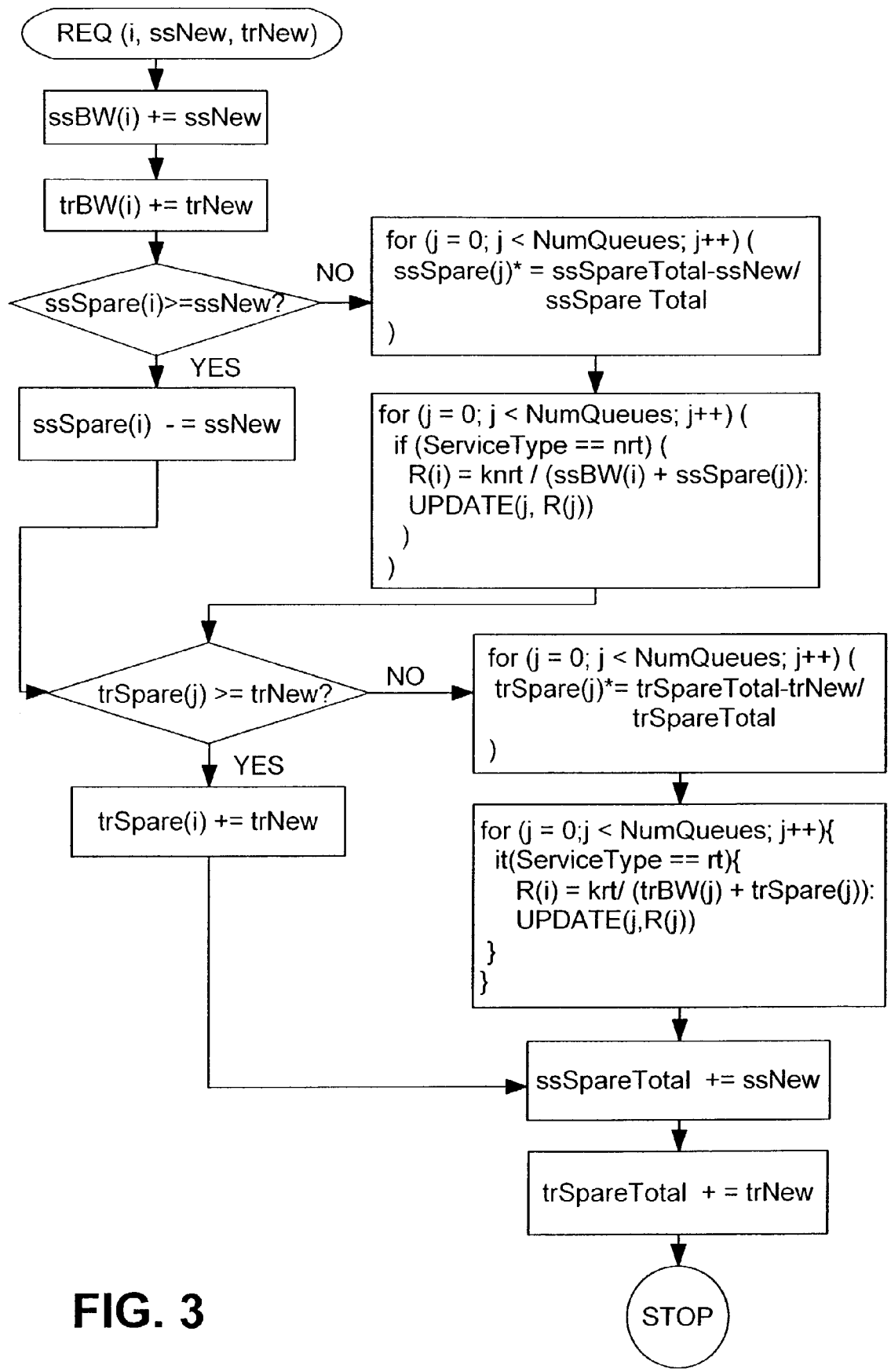
FIG. 3 illustrates the WFQ Control request for bandwidth algorithm.

FIG. 3 illustrates the algorithm performed by WFQ Control when additional bandwidth is requested by CAC. In this figure ssSpare(i) and trSpare(i) represent respectively the steady-state and transient spare bandwidth allocated to queue i, ssTnrt is the total bandwidth in the steady-state pool allocated to non-real-time queues, ssSpareTotal and trSpareTotal are the total spare bandwidth in the steady state and transient pools respectively, ssBW(i) and trBW(i) represent respectively the steady-state and transient bandwidth allocated to queue i, and ssNew and trNew are the incremental steady-state and transient BW demands. In the implementation of this algorithm, multiple queue weights would be downloaded in the same message.

Figure 4:
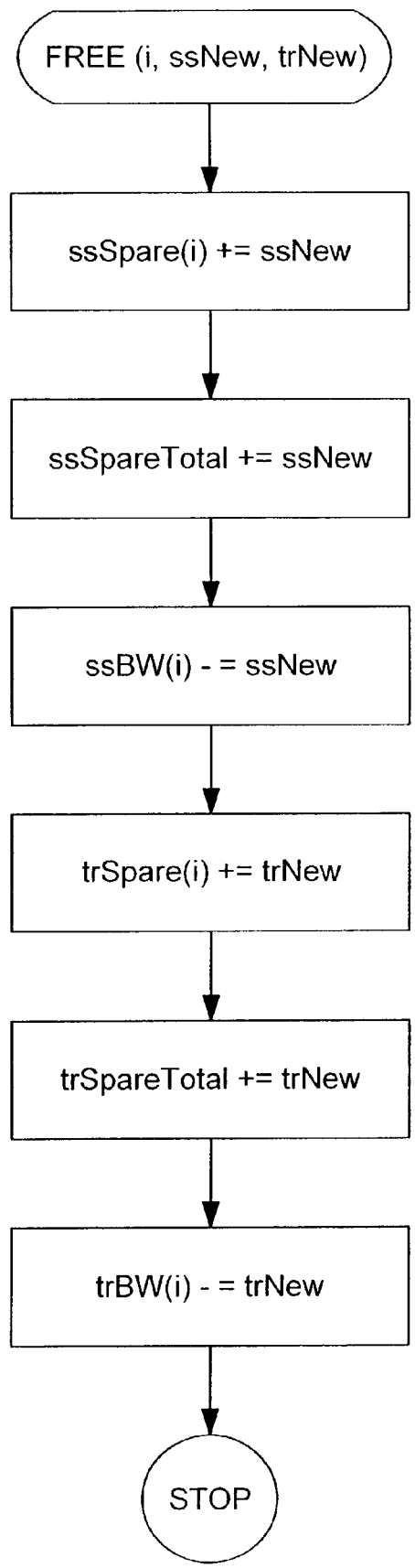
FIG. 4 illustrates the WFQ Control bandwidth release algorithm.

When CAC informs WFQ Control that a connection has been released, that bandwidth is placed in the spare parts of the associated service queue. The algorithm is illustrated in FIG. 4.

While a particular embodiment of the invention has been described and illustrated it will be apparent to one skilled in the art to which the invention pertains that many alternatives and variations can be effected. It is to be understood that such alternatives and variations will come within the scope of the invention as defined by the attached claims.

The invention claim is:

1. A method of adaptively controlling the assignment of respective service weights to multiple queues at a queuing point in a digital communication system, the queuing point including an arbiter providing fair arbitration between said multiple queues in accordance with the respective service weights, the method comprising:

determining, at a call processor receiving a new service event, a bandwidth requirement associated with said new service event respecting one of said multiple queues;

comparing the bandwidth requirement with a spare bandwidth allocated to said one of said multiple queues;

if the bandwidth requirement can not be accommodated, extracting spare bandwidth from all of said queues in equal proportion, calculating, by said call processor, new service weight information and providing said new service weight information to said arbiter, and calculating a new service weight for said one of said multiple queues.

2. The method as defined in claim 1 wherein said bandwidth requirement associated with the new service event is determined by a Call Admission Control in said call processor.

3. The method as defined in claim 2 wherein the bandwidth requirement is determined in a Weighted Fair Queuing (WFQ) controller at the call processor.

4. The method as defined in claim 3 wherein said new service event is the set up of a new service connection and said determined bandwidth requirement represents an increase in bandwidth required by said of one of said multiple queues.

5. The method as defined in claim 3 wherein said new service event is the tearing down of an existing service connection and said determined bandwidth represents a release of bandwidth.

6. The method as defined in claim 5 wherein said release in bandwidth is returned to said queue as spare bandwidth.

7. The method as defined in claim 6 wherein spare bandwidth is allocated to queues which have most recently had bandwidth extracted therefrom.

8. The method as defined in claim 4 wherein said increase in bandwidth includes bandwidth for a real time connection.

9. The method as defined in claim 8 wherein said increase in bandwidth includes bandwidth dedicated to steady state requirements.

10. The method as defined in claim 8 wherein said increase in bandwidth also includes bandwidth dedicated to transient requirements.

11. The method as defined in claim 8 wherein said increase in bandwidth includes bandwidth for a non real time connection.

12. The method as defined in claim 1 wherein if the bandwidth requirement is less than the spare bandwidth, the spare bandwidth allocated to said one of said multiple queues is reduced.

13. A system for adaptively controlling the assignment of respective service weights to multiple queues, at a queuing point in a digital communication system, the queuing point including an arbiter providing fair arbitration between the multiple queues in accordance with the respective service weights, the system comprising:

a call processor for receiving a new service event and determining a bandwidth requirement associated with said new service event respecting one of the multiple queues, said call processor calculating new service weight information and providing the new service weight information to the arbiter;

a Connection Admission Controller (CAC) within the call processor, for determining the bandwidth requirement associated with the new service event and for downloading incremental values for steady state bandwidth requirements and incremental values for transient bandwidth requirements associated with the new service event;

a WFQ controller for maintaining lists of information relating to respective queues, said lists including queue identification, required steady state and transient bandwidth for respective queues, spare steady state and transient bandwidth for respective queues, and a weighting factor for each.

14. A system as defined in claim 13 wherein said digital communication system is an Asynchronous Transfer Mode (ATM) network.

15. A method of controlling bandwidth allocation to multiple queues at a queuing point in a digital communication system, the queuing point providing fair arbitration of a total bandwidth available at said queuing point between multiple queues, the method comprising:

classifying said queues into a real-time group of queues and a non real-time group of queues;

from said total bandwidth, defining a steady-state pool of bandwidth that includes all individual steady-state bandwidth ($ssBW_i$) and all individual spare steady-state bandwidth ($ssSpare_i$) for all queues;

defining a transient pool of bandwidth that includes a first transient bandwidth (trTrt) for said real-time group and a second transient bandwidth (trTnrt) for said non real-time group, wherein said first transient bandwidth includes all individual transient bandwidth ($trBW_i$) and all individual spare transient bandwidth ($trSpare_i$) for all queues in the real-time group;

allocating said steady-state pool of bandwidth to said real-time group and said non real-time group, and allocating said transient pool of bandwidth to said real-time group; and whenever a new real time connection temporarily requires additional bandwidth that surpasses said steady-state pool of bandwidth, using additional bandwidth for the new real time connection from said transient pool of bandwidth.

16. The method of claim 15 further comprising recalculating new service weight information for bandwidth reallocation only when said transient pool of bandwidth is depleted.

* * * * *